J. M. DALY.
RATCHET CLUTCH AND BRAKE MECHANISM.
APPLICATION FILED NOV. 4, 1905.
902,805.
Patented Nov. 3, 1908.
2 SHEETS—SHEET 1.
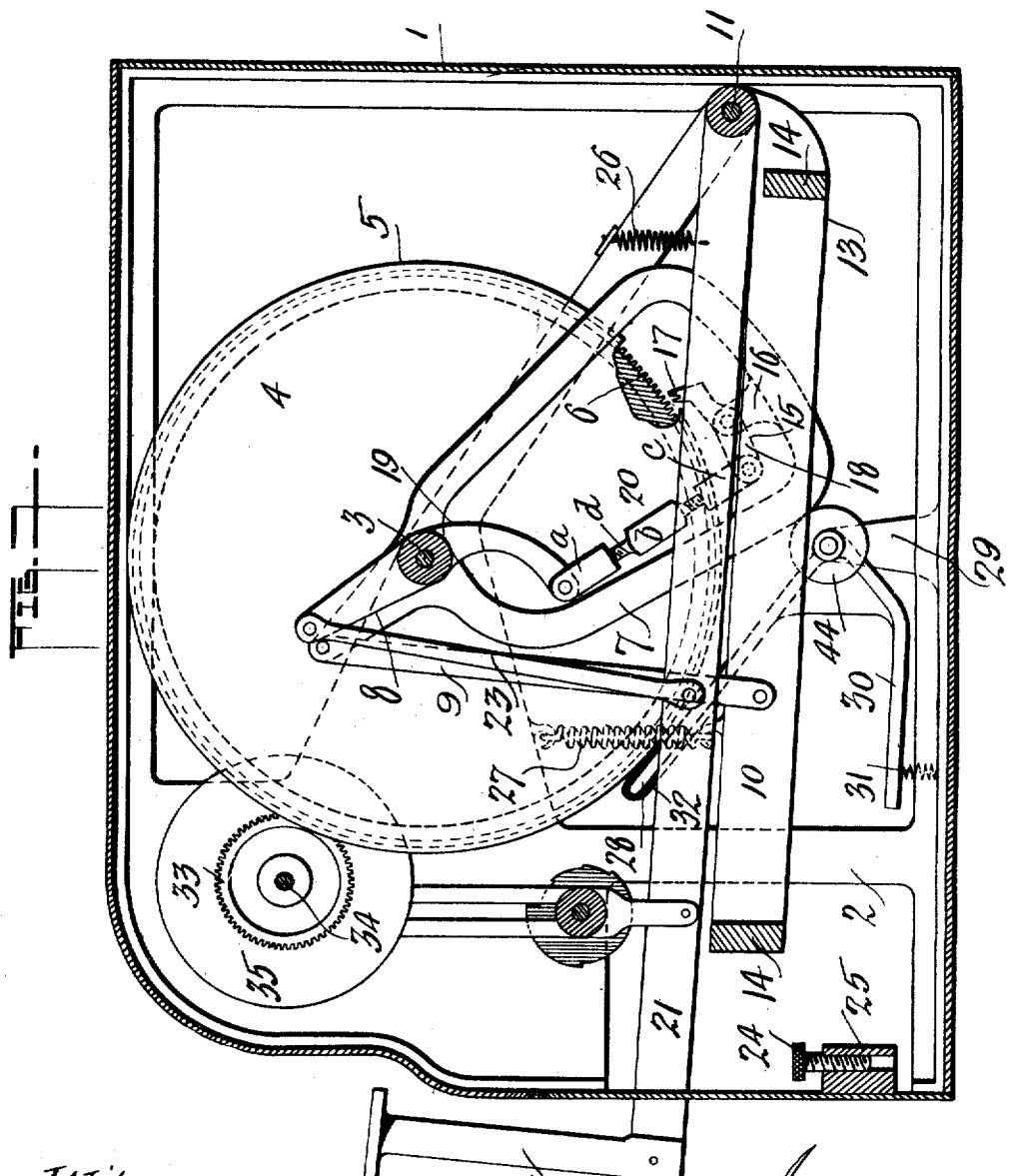
Witnesses:
H. V. Gibson
Chirich Daly
Inventor.
John M. Daly
By Chas. G. La Porte Atty.

J. M. DALY.
RATCHET CLUTCH AND BRAKE MECHANISM.
APPLICATION FILED NOV. 4, 1905.
902,805.
Patented Nov. 3, 1908.
2 SHEETS—SHEET 2.
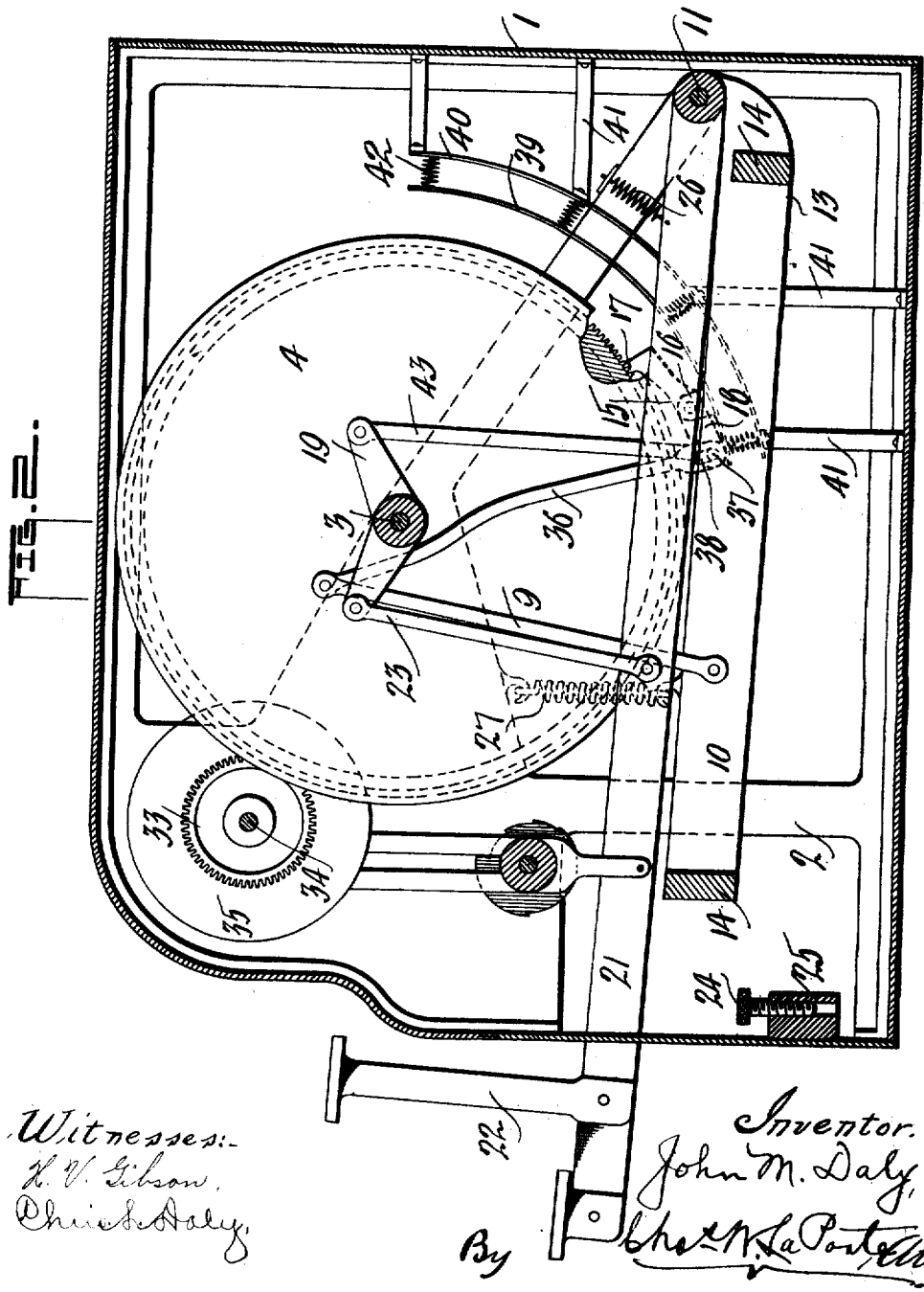

UNITED STATES PATENT OFFICE.

JOHN M. DALY, OF CHICAGO, ILLINOIS.

RATCHET CLUTCH AND BRAKE MECHANISM.

No. 902,805.   Specification of Letters Patent.   Patented Nov. 3, 1908.

Application filed November 4, 1905. Serial No. 285,869.

*To all whom it may concern:*

Be it known that I, JOHN M. DALY, a citizen of the United States, residing at Chicago, in the county of Cook and State of Illinois, have invented certain new and useful Improvements in Ratchet Clutch and Brake Mechanisms; and I do hereby declare that the following is a full, clear, and exact description of the invention, which will enable others skilled in the art to which it appertains to make and use the same.

This invention has reference to a ratchet clutch and brake-mechanism adapted to be employed as a means of transmitting motion to various parts of various machines. Its application may be upon a computing or adding machine and may be used for measuring or for adjusting the speed of autos, etc., or for spacing on typewriters, etc.

The invention has been designed with special reference to its application to computing machines or to tonnage equating machines, and its object is to control the momentum or throw-by of the parts of such devices.

Attention is directed to applications for patents filed by me for improvements in computing machines on April 11, 1904 numbered 202,552 and 202,553; also the application for patent for improvements in tonnage equating machines filed August 15, 1905 Number 274,342, to which the within improvements may be applied.

The invention consists essentially of a driving wheel having a smooth periphery and a ratchet gear attached to or forming a part of the said driving wheel. A shaft to which the driving wheel is secured. A yoke-frame loosely carried on the said shaft and having an extension with which is pivotally connected a reach bar. A link-frame with which the said reach bar has a pivotal connection. A crank arm loosely carried on the aforesaid shaft. A toothed pawl pivotally attached to the yokeframe and adapted to have an intermittent engagement with the toothed portion of the driving wheel. Connections between the said toothed pawl and the crank arm aforesaid. Means connected with the crank arm whereby the toothed pawl may be caused to engage the toothed portion of the driving wheel, said means adapted to engage the link-frame for imparting movement to the yoke-arm and through the pawl attached thereto and engaging the toothed portion of the wheel aforesaid, impart movement to the said wheel. And a brake-shoe yieldingly held in engagement with the peripheral face of the said drive wheel.

The invention consists further in the combination of a driving shaft and a driving wheel carried thereon, said driving wheel having a smooth peripheral face and also a toothed portion; and pivotally mounted link-frame; a toothed pawl adapted to have an intermittent engagement with the toothed portion of the driving wheel; connection between the link-frame and the said toothed pawl and lever adapted to have engagement with the link-frame; means connecting the said lever with the toothed pawl; the connection of the lever with the toothed pawl and its engagement with the link-frame adapting the control of the toothed pawl to cause its engagement with the toothed portion of the driving wheel and the movement of said pawl when the said lever engages the said link-frame, and means for regulating the throw of said lever.

For a further and full description of the invention herein and the merits therof, and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings in which:—

Figure 1 is a side elevation partly in section of my improved ratchet clutch and brake mechanism and its application to a computing machine; Fig. 2 is an elevation and sectional view somewhat as seen in Fig. 1, only that the ratchet clutch and brake mechanism is of a modified form and operates just the reverse to that shown in Fig. 1.

Like numerals of reference indicate corresponding parts throughout the figures.

In the drawings 1 denotes a casing of suitable outline attached to the open work frames 2 which may be disposed at opposite ends of the casing and at other desirable points intermediate the outside frames, for supporting suitable working parts of the machine.

3 indicates a driving shaft carried longitudinally through or within the casing 1 and journaled in the frames 2. At a suitable point on the shaft 3 is carried a driving wheel 4 which is of suitable diameter and provided with the smooth peripheral face 5 and a toothed portion 6. One side of the driving wheel is shown in the accompanying drawings as broken away, to illustrate the toothed portion 6 thereof, which is otherwise shown by dotted lines only.

Loosely carried on the shaft 3 is a yoke-frame 7 having an arm extension 8. The said yoke-frame and its extension is positioned adjacent to one side of the driving wheel 4 and pivotally connected with the outer end of extension 8 and the yoke-frame 7 is a reach bar 9, which, at its lower end is pivotally connected to a link-frame 10. Said link-frame is pivotally carried at its rear end on a rod 11 and the said frame consists of the end or intermediate brace bars 13 and the front and rear transverse connecting brace bars 14.

15 indicates a pawl pivotally connected with an ear 16 secured to or forming a part of the yoke-frame 7; said pawl being provided with the toothed portion 17 adapted to have an intermittent engagement with the toothed portion 6 of the driving wheel 4 and also provided with a rear extension 18.

19 indicates a crank arm loosely carried on the shaft 3 adjacent to the yoke-frame 7 thereon, and connecting the lower portion of the crank arm 19 with the extension 18 of the pawl 15 is a three piece arm 20; the said arm comprising the sections $a$, $b$, $c$, $a$ pivotally connected with the crank arm 19 and $c$ pivotally connected with the extension 18 of the pawl 15 is a three piece arm 20; the said arm having threaded sockets in which threaded ends $d$, of section $b$ have screw connection, to provide for an adjustable connection between the said crank arm 19 and the pawl 15.

21 indicates a suitable key-bar or lever pivotally carried on the rod 11 and extending out through the casing 1 may have attached thereto the finger engaging portion 22, whereby the bar or lever 21 may be depressed, the casing as will be understood being slotted to adapt the vertical movement of the said key-bar or lever. Pivotally connected with the key-bar 21 is shown a reach bar 23 which also has a pivotal connection with the upper portion or extension of the crank arm 19. The resulting operation in the depressing of the key-bar 21, will depress the reach bar 23, oscillating the crank arm 19 on the shaft 3 which will impart movement to the three piece arm 20 and it in turn will cause the tooth portion 17 of the pawl 15 to engage the toothed portion 6 of the driving wheel 4. It is intended that the throw of the key-bar or lever 21 in its initial movement will only be sufficient to cause the pawl to engage the toothed portion of the driving wheel, when simultaneously with such engagement movement will be imparted to the yoke-frame 7 and it being raised or oscillated on the shaft 3 will partially rotate the driving wheel 4 through the connection of the pawl with the driving wheel and the yoke-frame. This I accomplish by means of the reach bar 9 connected with the extension of the yoke-frame and the link frame 10. For, as shown in the drawings, there is provided space between the under side of the lever 21 and the forward cross brace 14 of the link-frame which permits the lever 21 to be depressed the given distance which is sufficient to permit the pawl to engage the teeth of the driving wheel before movement is imparted to the link-frame and simultaneous with the engagement of the pawl with the teeth of the wheel the lever depresses the link-frame, which carries with it the reach bar 9 and it lowering the extension 8 of the link-frame oscillates the said frame which movement will elevate the lower end of the link-frame and carry with it the pawl 15 and result in a partial rotation being imparted to the driving wheel 4, the movement of the driving wheel and the parts operating it continuing until the lever 21 reaches the limit of its movement or is released by the operator. For the purpose of limiting the throw of the lever 21 as well as adjusting the throw I have provided the stop 24 which has a threaded engagement with the lug 25 attached to the inner face of the top of the casing 1. Upon the release of the lever it is intended that the same shall be returned to its elevated position by means of the spring 26 and likewise it is intended that the link-frame 10 shall be returned to its elevated position by means of a spring 27. Upon the release of the lever, simultaneously therewith, the pawl will disengage itself from the teeth of the wheel 4. However, the release of the pawl from the teeth of the wheel will not occur until after the wheel has come to a dead stop or the momentum and throwby of the wheel or parts connected therewith has been overcome. To at all times retain the driving wheel 4 in a normal position, that is, just prior to the engagement of the pawl with the teeth thereof, and subsequent to the release of the said pawl and during its return movement, I employ a brake-shoe 28 pivotally connected with a standard or bracket 29, which said brake-shoe has an extension 30 engaged by a spring 31 for yieldingly holding the upper end of the brake-shoe against the peripheral face 5 of the driving wheel 4. That portion of the brake-shoe which engages with the face of the wheel 4 may be covered with rubber, leather or other suitable material, herein indicated as 32.

When embodying the invention in connection with a computing machine, I employ a small pinion 33 carried on a shaft 34 and place the pinion in mesh with the teeth of the driving wheel 4. The shaft 34 may carry registering devices or be suitably connected therewith, but for convenience I have provided on the shaft 34 a wheel 35 which may serve in this instance as the registering wheel.

In Fig. 1 and from the description thereof, it will be understood that the operation of the driving wheel 4 takes place on the down throw of the lever and the upward movement of the yoke-frame and the pawl connected therewith, however. I have shown in Fig. 2 a modification wherein it is illustrated that the movement of the driving wheel 4 takes place on the upward movement of the lever 21 and the downward or return movement of the pawl 15. In this construction for the yoke-frame 7 I have substituted a reach 36 which is pivotally connected with the reach-bar 9 or a corresponding part to that shown in Fig. 1, and the lower end of the reach 36 has a pivotal connection with a pin 37 of the pawl 15 and said pin also has a slidable connection in an elongated slot 38 of the lower end of the reach 36. The ear 16 to which the pawl 15 is pivotally connected is adapted to have a slidable relation with an arched frame or bar 39 yieldingly held away from an arched plate 40 forming a support for the plate 39 and the said plate 40 is supported through bracket connections 41 connected with the casing 1. For yieldingly holding the plate 39 separated from the plate 40 I employ the springs 42 connected with both of said plates and the office of said springs is to retain the plate 39 in a position where the ear 16 will retain the toothed portion of the pawl in engagement with the toothed portion of the driving wheel when the parts connected with said clutch are in a position to permit such engagement. The connection between the ear 16 and the plate 39 is immaterial, so long as it is such that it cannot be dislodged but retained for a slidable connection with said plate.

The operation of the parts as seen in Fig. 2 may be understood when it is said that upon the depression of the lever 21 and the bar 23 connected therewith, a reach-bar 43 which is used as a substitute for the connection 20 in Fig. 1, and which has a pivotal connection at 37 with the pawl and at its upper end with the crank arm 19 the extension 18 of the pawl will be raised and thereby disengage the toothed portion of the pawl from the toothed portion of the driving wheel 4 and simultaneously with such disconnection, the lever 21 has engaged the link-frame and the downward movement of the latter through the pressure applied on the lever will cause the ear 16 with the pawl to move upwardly on the plate 39 with the said plates slightly depressed to prevent any engagement of the toothed portion of the pawl with the driving wheel, but instantly upon the release of the lever and its component parts the springs 42 exert their pressure on the plate 39 and the pawl having engaged the teeth of the driving wheel will be firmly held by the springs and the plate 39 in such engagement and the springs 26 and 27 returning the lever and the link-frame to their normal positions will cause a partial rotation to be imparted to the driving wheel, all of which it is believed will be understood.

In Fig. 2 the brake-shoe 32 has been omitted, but it is understood that it may or may not be used in the modified form shown in Fig. 2.

I have shown in connection with the yoke-frame 7 shown in Fig. 1, a stop to limit the return movement of the said yoke-frame after it has been actuated, this stop consists of a roller or other suitable member 44 which is carried by the bracket 29.

In a device of the character described and where it is desired to transmit motion from a revoluble driving part through the actuation of a lever or a similar member there is more or less momentum to be overcome and it is necessary to provide against the parts throwing by. With the application of the connections such as the pawl and component parts with a driving wheel it is practically impossible to obtain more movement of the driving wheel than that permitted by the throw of the lever, for in Fig. 1, so long as the pawl is in engagement with the driving part the throw of the said driving part will necessarily be limited to the movement of the pawl and the said driving part will have come to a dead stop by the time the pawl is released therefrom, and to insure such movement the brake-shoe is applied, although it has been found that the latter may be dispensed with.

Having thus fully described my invention what I claim and desire by Letters Patent, of the United States, is:—

1. In a device of the character described, the combination with registering mechanism, a driving wheel geared to such mechanism, said driving wheel having a smooth peripheral face and a toothed portion, a driving shaft to which the said wheel is attached, a toothed pawl adapted to have an intermittent engagement with the toothed portion of the said wheel, means for causing the pawl to have engagement with the wheel, said means comprising a pawl carrying element, a crank arm on the driving shaft, a connection between one end of the said crank arm and one end of the pawl, a key bar, and connections between the key bar and the other end of the crank arm, means for moving the said pawl during its engagements with the wheel for imparting a partial rotation thereto, and a separate means adapted to return the key-bar to its normal position and a brake comprising a spring pressed rocker arm yieldingly held in engagement with the peripheral face of the said wheel.

2. In a device of the character described, the combination with registering mechanism, a driving wheel geared thereto, a driving shaft carrying the said wheel, an oscillating frame mounted on the shaft adjacent to said wheel, a pawl pivotally attached to the frame and adapted to have engagement with the wheel, a crank arm mounted on said driving shaft, a connection between one end of said crank arm and one end of said pawl, a link-frame, connection between the link-frame and the oscillating frame, a key-bar, connected with the pawl aforesaid and adapted to control its engagement with the driving wheel and simultaneous with the engagement with the pawl with said wheel adapted to depress the link-frame and operate the oscillating frame for imparting a partial rotation to the driving wheel through the connection of the pawl aforesaid and a separate means adapted to return the key-bar and the link frame to normal positions and a brake comprising a spring pressed pivoted rocker arm yieldingly held in engagement with the peripheral face of the said wheel.

In testimony whereof I affix my signature, in presence of two witnesses.

JOHN M. DALY.

Witnesses:
EDWARD J. REILLY,
C. B. WINTERSMITH.